United States Patent
Champel et al.

(10) Patent No.: US 10,833,944 B2
(45) Date of Patent: Nov. 10, 2020

(54) DISTRIBUTION OF BANDWIDTH IN A NETWORK

(71) Applicant: THOMSON Licensing, Issy-les-Moulineaux (FR)

(72) Inventors: Mary-Luc Champel, Marpire (FR); Charline Taibi, Chartres de Bretagne (FR); Remi Houdaille, Cesson Sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 209 days.

(21) Appl. No.: 15/549,810

(22) PCT Filed: Feb. 5, 2016

(86) PCT No.: PCT/EP2016/052532
§ 371 (c)(1),
(2) Date: Aug. 9, 2017

(87) PCT Pub. No.: WO2016/128326
PCT Pub. Date: Aug. 18, 2016

(65) Prior Publication Data
US 2018/0048526 A1 Feb. 15, 2018

(30) Foreign Application Priority Data
Feb. 11, 2015 (EP) .................................... 15305200

(51) Int. Cl.
*H04L 12/24* (2006.01)
*H04L 29/06* (2006.01)
*H04L 29/08* (2006.01)

(52) U.S. Cl.
CPC ...... *H04L 41/0896* (2013.01); *H04L 65/1083* (2013.01); *H04L 65/4084* (2013.01);
(Continued)

(58) Field of Classification Search
CPC ..... H04L 41/0896; H04L 65/80; H04L 67/14; H04L 67/02
(Continued)

(56) References Cited

U.S. PATENT DOCUMENTS 7,023,979 B1 * 4/2006 Wu ................ H04M 3/5233
379/265.11
7,653,084 B2 * 1/2010 Shin ................ H04J 3/1694
370/329

(Continued)

FOREIGN PATENT DOCUMENTS

CN 101146021 A 3/2008
CN 101184021 A 5/2008
(Continued)

OTHER PUBLICATIONS

Jiang et al., "Improving Fairness, Efficiency, and Stability in HTTP-Based Adaptive Video Streaming With Festeve", IEEE/ACM Transactions on Networking, vol. 22, No. 1, Feb. 2014, pp. 326-340.

*Primary Examiner* — Minh Chau Nguyen
(74) *Attorney, Agent, or Firm* — Volpe Koenig (57) ABSTRACT

The invention concerns the exchange of parameters between communication devices of a network describing their respective data sessions and the application, at a communication device, of a bandwidth distribution algorithm using the exchange parameters to allocate bandwidth to one or more data sessions in the network.

23 Claims, 3 Drawing Sheets

(52) U.S. Cl.
CPC .............. *H04L 65/80* (2013.01); *H04L 67/14* (2013.01); *H04L 67/322* (2013.01); *H04L 41/5022* (2013.01); *H04L 67/02* (2013.01)

(58) Field of Classification Search
USPC ........................................................ 709/226
See application file for complete search history.

(56) References Cited

U.S. PATENT DOCUMENTS

| | | | | |
|---|---|---|---|---|
| 8,149,771 | B2* | 4/2012 | Khivesara | H04L 12/1881 |
| | | | | 370/230 |
| 8,462,809 | B2* | 6/2013 | Spinar | H04W 28/20 |
| | | | | 370/336 |
| 8,521,955 | B2 | 8/2013 | Arulambalam et al. | |
| 8,595,374 | B2 | 11/2013 | Puthenpura et al. | |
| 9,413,637 | B2 | 8/2016 | Keesara et al. | |
| 2001/0024239 | A1* | 9/2001 | Feder | H04N 7/165 |
| | | | | 348/423.1 |
| 2002/0048258 | A1 | 4/2002 | Oyama | |
| 2004/0066785 | A1* | 4/2004 | He | H04L 12/5601 |
| | | | | 370/395.21 |
| 2004/0143663 | A1* | 7/2004 | Leedom | H04L 47/15 |
| | | | | 709/226 |
| 2007/0041384 | A1* | 2/2007 | Das | H04Q 11/0067 |
| | | | | 370/395.4 |
| 2008/0192650 | A1 | 8/2008 | Kolhi | |
| 2010/0067432 | A1 | 3/2010 | Baptista et al. | |
| 2012/0102162 | A1 | 4/2012 | Devireddy | |
| 2012/0257894 | A1* | 10/2012 | Sarashina | H04J 14/0234 |
| | | | | 398/58 |
| 2012/0281529 | A1* | 11/2012 | Singamsetty | H04L 41/0896 |
| | | | | 370/230 |
| 2013/0219056 | A1 | 8/2013 | Mikan et al. | |
| 2017/0171103 | A1* | 6/2017 | Gouache | H04N 21/436 |

FOREIGN PATENT DOCUMENTS

| | | |
|---|---|---|
| CN | 100583820 C | 1/2010 |
| CN | 103905315 A | 7/2014 |
| EP | 1875665 B1 | 9/2014 |
| EP | 2879339 | 6/2015 |
| JP | 2002026986 A | 1/2002 |
| JP | 2002124981 A | 4/2002 |
| JP | 2009188655 A | 8/2009 |
| JP | 2009194509 A | 8/2009 |
| JP | 2012095299 A | 5/2012 |
| RU | 2481720 C2 | 5/2013 |
| WO | WO 2010078281 A2 | 7/2010 |
| WO | WO 2015078658 A1 | 6/2015 |

* cited by examiner

DISTRIBUTION OF BANDWIDTH IN A NETWORK

This application claims the benefit, under 35 U.S.C. § 365 of International Application PCT/EP2016/052532, filed Feb. 5, 2016, which was published in accordance with PCT Article 21(2) on Aug. 18, 2016, in English, and which claims the benefit of European Application No. 15305200.6 filed Feb. 11, 2015.

TECHNICAL FIELD

The present invention relates to a method and device for distribution of bandwidth in a network. Particularly, but not exclusively, the invention relates to bandwidth distribution for adaptive streaming clients.

BACKGROUND

HTTP adaptive technologies are used for the delivery of audiovisual data in the Internet. Such technologies enable a client device to receive video in the form of small successive segments, often referred to as chunks. Each segment is requested through the HTTP protocol and may exist in different variants (so called representations), allowing the client device to choose at any time an appropriate bit rate matching the network and device constraints.

Among the HTTP adaptive streaming (HAS) protocols which are already used, the most famous are the HTTP Live Streaming (HLS) from Apple, the Silverlight Smooth Streaming (SSS) from Microsoft, the HTTP Dynamic Streaming (HDS) from Adobe and the Dynamic Adaptive Streaming over HTTP (DASH) initiated by 3GPP within the SA4 group and developed by MPEG.

MPEG-DASH (aka DASH, Dynamic Adaptive Streaming over HTTP, ISO/IEC 23009) defines a complete solution for the delivery of content over networks with time varying capabilities (bandwidth).

During the playout of content of a data session, an MPEG-DASH client requests chunks of content from a server and uses its knowledge of the network conditions, its own constraints, and the lists of available representations of the same content (usually same content with different coding bitrates) in order to request the most appropriate representation. Chunk duration is usually set to a few seconds, thus allowing DASH clients to switch from one representation to another every few seconds in order to dynamically adapt to network conditions. When low bandwidth is available, DASH clients request low bitrate chunks and they may request higher bitrate chunks should higher bandwidth become available.

The list of available representations for a given content is described in a manifest file (MPD, Media Presentation Description) which is retrieved by a DASH client. After parsing the MPD the DASH clients discover the URLs from where to request content chunks. The MPD also allows the client to discover representation information (such as bandwidth requirements) so it can perform dynamic adaptation by switching among all representations when network conditions requires it.

Typically when dynamic aspects of DASH are used, content is distributed over HTTP and TCP. TCP is a bandwidth friendly protocol where all TCP connections try to evenly share the overall network bandwidth among them. Unfortunately, other protocols such as UDP can be less bandwidth friendly stealing all bandwidth from TCP. Moreover, even between different TCP connections it is difficult to ensure a fixed and uneven repartition of bandwidth; which is problematic when some devices actually require more bandwidth than others. For instance, a DASH client playing an UltraHD stream on a master TV in the living room requires more bandwidth than a DASH client playing an HD stream on a mobile phone. But in the event they both run at the same time and that the overall network bandwidth is not enough to accommodate both of them, the DASH client adaptation mechanism will generate a fight over bandwidth between the two clients, resulting in a degraded quality for both of the clients. As expected, the more DASH clients competing, the more critical the situation is. Moreover, in a traditional DASH implementation, a DASH client is unaware of the presence of other DASH clients competing with him for the same network bandwidth availability. All a DASH client can see is a very varying availability of bandwidth due to the varying consumption of network bandwidths by other(s) DASH client(s).

The present invention has been devised with the foregoing in mind.

SUMMARY

In a general form the invention concerns the exchange of parameters between communication devices of the network describing their respective data sessions (traffic sessions or data traffic sessions) and the application, at a communication device, of a bandwidth distribution algorithm using the exchange parameters to allocate bandwidth to one or more data sessions in the network.

According to a first aspect of the invention there is provided a method for distributing available bandwidth in a network among a plurality of data sessions of communication devices in the network, the method comprising at a communication device:

applying a bandwidth distribution algorithm using at least one bandwidth parameter to provide an allocated bandwidth for a data session to be run or being run at the said communication device, and any other data session to be run or being run by other communication devices in the network, the at least one bandwidth parameter being obtained from information messages exchanged between the said communication device and at least one other communication device of the network and being indicative of the required bandwidth for a data session to be run at the communication device from which the corresponding information message is sent.

In one or more embodiments the communication device is configured for adaptive streaming, for example in accordance with MPEG-DASH.

In embodiments an allocated bandwidth is determined for each data session to be run or run in the network. The allocated bandwidth may in some cases be zero bandwidth.

In embodiments, the information message signals the corresponding data session to be run or being run.

The at least one parameter in a respective information message includes one or more of the following:

priority data representative of a level of priority of the corresponding data session;

chunk duration data representative of the time duration of a data segment of the corresponding data session; and bandwidth data representative of at least one operable bandwidth of the corresponding data session.

In some embodiments the information message contains bandwidth distribution algorithm data representative of a selected bandwidth distribution algorithm to be used to provide the allocated bandwidth.

In an embodiment, the bandwidth distribution algorithm comprises dividing the available bandwidth into equal shares for allocation to each of the data sessions having a highest level of priority with respect to the level of priority of other data sessions to be run or running.

The data content of each data session may have a corresponding plurality of representations and one of the representations is selected according to the bandwidth allocated by dividing the available bandwidth, the selected representation corresponding to the representation requiring the greatest bandwidth which is within the allocated bandwidth.

In an embodiment, in the case where the required bandwidth for the selected representation is less than the allocated bandwidth, at least part of the remaining bandwidth is reallocated to a data session of the highest priority for which the corresponding information message was sent before the other information messages for other data sessions of the highest priority.

In an embodiment, in the case where the required bandwidth for the selected representation is less than the allocated bandwidth, at least part of the remaining bandwidth is allocated to a data session of a next lower priority level. The allocation to a data session to a lower priority is based on at least one of: the priority level of the data session; the time of transmission of the corresponding information message; and the start time of the data session.

In an embodiment, the bandwidth distribution algorithm comprises allocating the maximum possible bandwidth to a data session having the highest level of priority compared to the priority of other data sessions and for which the corresponding information message was sent before the other information messages for other data sessions of the highest priority, the maximum possible bandwidth corresponding to a representation of the content of the data session requiring the greatest bandwidth with respect to other representations of the same content, within the available bandwidth.

In an embodiment the bandwidth distribution algorithm comprises allocating the maximum possible bandwidth to at least one data session based on the level of priority of the data session and the time of emission of the corresponding information message. In particular, the maximum possible bandwidth is allocated to a data session of highest priority for which the corresponding information message was sent before the other information messages for other data sessions of the same priority; The maximum possible bandwidth corresponds to a representation of the content of the data session requiring the greatest bandwidth with respect to other representations of the same content, within the available bandwidth.

In an embodiment, the bandwidth distribution algorithm comprises allocating the bandwidth corresponding to a representation of the content data session requiring the least bandwidth.

In an embodiment the method may further include reallocating any remaining available bandwidth to a data session to enable a higher level of representation based on at least one of the priority level of the data session, the time of transmission of the corresponding information message and the start time of the data session.

In an embodiment, within a given priority level the available bandwidth remaining is allocated to a data session based on at least one of the time of transmission of the information message for the corresponding data session and the start time of the data session.

In an embodiment, the information messages are sent to and received from a fixed multicast address for forwarding to the other communication devices.

In an embodiment, the information messages are exchanged via a central base device.

In an embodiment, the same bandwidth allocation algorithm is used by all the communication devices starting a data session In an embodiment the bandwidth allocation algorithm is selected according to at least one of a priority level allocated to each bandwidth allocation algorithm and the number of communication devices selecting each bandwidth algorithm According to a second aspect of the invention there is provided a communication device comprising communication interface for exchanging information messages with one or more other communication devices in a same network, each information message comprising at least one bandwidth parameter indicative of the required bandwidth for a data session to be run or running at the communication device from which the corresponding information message is sent and one or more processors configured to apply a bandwidth distribution algorithm using the at least one bandwidth parameter to provide an allocated bandwidth for a data session to be run or running at the said communication device. In some embodiments the bandwidth distribution algorithm is applied using the at least one bandwidth parameter to provide an allocated bandwidth for each data session to be run or running in the network. Each data session may have a corresponding information message.

The one or more processors of the communication device may be configured to perform any of the steps of embodiments of the first aspect of the invention.

The presence of a corresponding information method from a communication device in some embodiments of the invention indicates an ongoing (running) data session or a data session to be started (to run) at that communication device.

An aspect of the invention provides a method for distributing available bandwidth of a network among a plurality of data sessions of respective communication devices in the network, the method comprising, for a communication device in the network, transmitting an information message to other communication devices in the network;

receiving an information message from at least one of the other communication devices in the network; wherein each information message contains at least one parameter indicative of the required bandwidth for a data session at the corresponding communication device; and applying a bandwidth distribution algorithm to provide an allocated bandwidth for the data session of the said communication device, wherein the at least one parameter of each information message is used by the bandwidth distribution algorithm.

In embodiments of the invention information messages are received from all other communication devices initiating or having an ongoing data session.

According to an aspect of the invention there is provided a method for distributing available bandwidth in a network among a plurality of data sessions of communication devices in the network, the method comprising: applying a bandwidth distribution algorithm to provide an allocated bandwidth for each data session to be run or being run by communication devices of the network; wherein the bandwidth distribution algorithm comprises allocating the maximum required bandwidth to at least one data session of a highest level of priority compared to other data sessions and for which a corresponding information message signaling the data session was sent before the other information messages for other data sessions of the same priority level, the maximum required bandwidth of the data session corresponding to a representation of the content of the data session requiring the greatest bandwidth, with respect to other representations of the same content, within the available bandwidth.

According to an aspect of the invention there is provided a communication device comprising one or more processors configured to: apply a bandwidth distribution algorithm to provide an allocated bandwidth for each data session to be run or running by communication devices of the network; wherein the bandwidth distribution algorithm comprises allocating the maximum possible bandwidth to at least one data session in order of level of priority and for which a corresponding information message signaling the data session was sent before the other information messages for other data sessions of the same priority level, the maximum possible bandwidth of the data session corresponding to a representation of the content of the data session requiring the greatest bandwidth, with respect to other representations of the same content, within the available bandwidth.

In an embodiment, within a given priority level the bandwidth remaining is allocated to other data sessions based on at least one of the priority level of the data session, the time of transmission of the information message for the corresponding data session and the start time of the data session.

In an embodiment, within a given priority level an increased share of the bandwidth is allocated to at least one data session for which the corresponding information message was sent before the other information messages for other data sessions of the same priority.

In an embodiment, wherein within a given lower priority level the bandwidth corresponding to a representation of the content of the data session requiring the least bandwidth is allocated to at least one data session.

In an embodiment, the method includes or the device is configured for reallocating any remaining available bandwidth to a data session in the given lower priority level to enable a higher level of representation based on at least one of the priority level of the data session, the time of transmission of the corresponding information message and the start time of the data session.

In an embodiment, the method includes or the device is configured for dividing the remaining bandwidth into equal shares for allocation to each of the data sessions in a lower given level of priority.

In an embodiment, a representation of the data content is selected for each data session according to the equal share of the bandwidth allocated, the selected representation being the representation requiring the greatest bandwidth which is less than or equal to the share of the bandwidth allocated.

In an embodiment, the method includes in the case where the required bandwidth for the selected representation is less than the equal share of the bandwidth allocated, at least part of the remaining bandwidth is reallocated to a data session of the given priority level for which the corresponding information message was sent before the other information messages for data sessions of the given priority.

In an embodiment at least one bandwidth parameter for the bandwidth distribution algorithm is obtained from information messages exchanged between communication devices of the network and being indicative of the required bandwidth for a data session to be run or running at the communication device from which the corresponding information message is sent.

An aspect of the invention provides a method for distributing available bandwidth in a network among a plurality of data sessions of communication devices in the network, the method comprising: applying a bandwidth distribution algorithm to provide an allocated bandwidth for each data session to be run or being run by communication devices of the network; wherein the bandwidth distribution algorithm comprises dividing the available bandwidth into equal shares for allocation to each of the data sessions having a highest level of priority.

An aspect of the invention provides a communication device comprising one or more processors configured to: apply a bandwidth distribution algorithm to provide an allocated bandwidth for each data session to be run or running by communication devices of the network; wherein the bandwidth distribution algorithm comprises dividing the available bandwidth into equal shares for allocation to each of the data sessions having a highest level of priority.

the data content of each data session has a corresponding plurality of representations and wherein one of the representations is selected for each data session according to the equal share of the bandwidth allocated, the selected representation being the representation requiring the greatest bandwidth which is less than or equal to the share of the bandwidth allocated.

In an embodiment, in the case where the required bandwidth for the selected representation is less than the equal share of the bandwidth allocated, at least part of the remaining bandwidth is reallocated to a data session of the highest priority for which the corresponding information message signaling the data session was sent before the other information messages for data sessions of the highest priority.

In an embodiment, in the case where the required bandwidth for the selected representation is less than the equal share of the bandwidth allocated, at least part of the remaining bandwidth is allocated to another data session based on at least one of: the priority level of the data session; the time of transmission of a corresponding information message signaling the data session; and the start time of the data session.

In an embodiment, within a given priority level the bandwidth remaining is allocated based on at least one of the time of transmission of an information message signaling the corresponding data session, and the start time of the data session.

In an embodiment, within a given priority level an increased share of the bandwidth is allocated to at least one data session for which a corresponding information message signaling the data session was sent before the other information messages for other data sessions of the same priority.

In an embodiment, within a given lower priority level the bandwidth corresponding to a representation of the content of the data session requiring the least bandwidth is allocated to at least one data session.

In an embodiment the method includes or the device is configured for reallocating any remaining available bandwidth to a data session in the given lower priority level to enable a higher level of representation based on at least one of the priority level of the data session, the time of transmission of the corresponding information message and the start time of the data session.

In an embodiment at least one bandwidth parameter for the bandwidth distribution algorithm is obtained from information messages exchanged between communication devices of the network and being indicative of the required bandwidth for a data session to be run or running at the communication device from which the corresponding information message is sent.

In an embodiment the information messages are exchanged via a central base device.

In an embodiment the same bandwidth allocation algorithm is used by all the communication devices starting or running a data session In an embodiment the bandwidth allocation algorithm is determined according to at least one of a priority level allocated to each bandwidth allocation algorithm and the number of communication devices selecting each bandwidth algorithm According to an aspect of the invention there is provided a method for distributing available bandwidth in a network among a plurality of data sessions of communication devices in the network, the method comprising:

applying a bandwidth distribution algorithm to provide an allocated bandwidth for one or more data sessions to be run or being run by communication devices of the network;

wherein the bandwidth distribution algorithm comprises allocating to one or more data sessions, the bandwidth corresponding to a representation of the data content of the respective data session requiring the least bandwidth.

An aspect of the invention provides a communication device comprising one or more processors configured to: apply a bandwidth distribution algorithm to provide an allocated bandwidth for each data session to be run or running by communication devices of the network; wherein the bandwidth distribution algorithm comprises wherein the bandwidth distribution algorithm comprises allocating to one or more data sessions, the bandwidth corresponding to a representation of the data content of the respective data session requiring the least bandwidth.

In an embodiment the method includes or the device is configured for reallocating any remaining available bandwidth to a data session, to enable a higher level of representation, the data session being selected based on at least one of the priority level of the data session, the time of transmission of a corresponding information message signaling the data session and the start time of the data session.

In an embodiment within a given priority level the available bandwidth remaining is allocated to other data sessions based on at least one of the priority level of the data session, the time of transmission of the information message for the corresponding data session and the start time of the data session.

In an embodiment at least one bandwidth parameter for the bandwidth distribution algorithm is obtained from information messages exchanged between communication devices of the network signaling the corresponding data session and being indicative of the required bandwidth for a data session to be run or running at the communication device from which the corresponding information message is sent.

Some processes implemented by elements of the invention may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system'. Furthermore, such elements may take the form of a computer program product embodied in any tangible medium of expression having computer usable program code embodied in the medium.

Since elements of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

Figure 1:
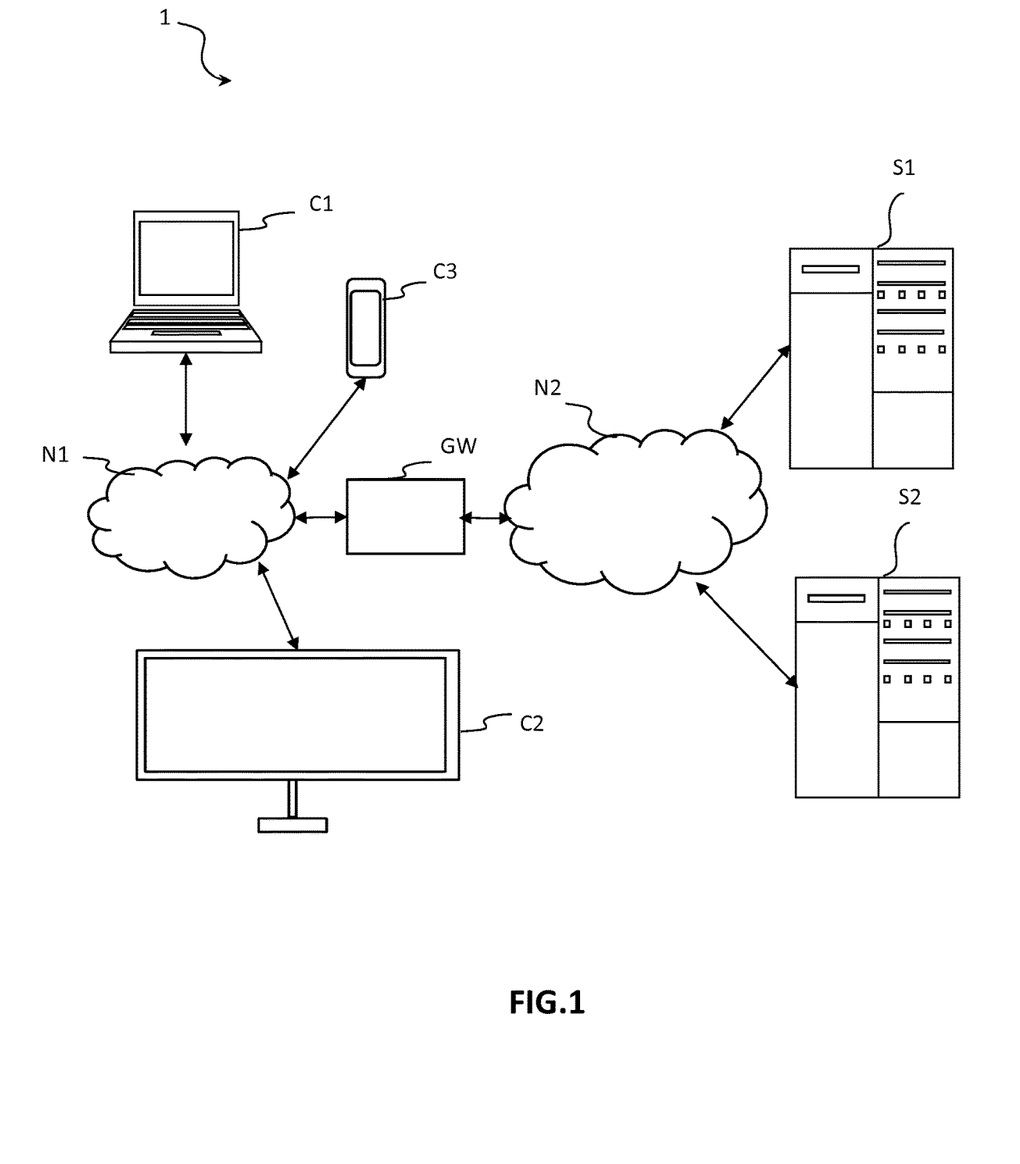
FIG. 1 is a schematic block diagram of a data communication system in which one or more embodiments of the invention may be implemented.

FIG. 1 is a schematic block diagram of a data communication system in which one or more embodiments of the invention may be implemented.

The data communication system 1 comprises a plurality of server devices S1, S2, a plurality of client devices C1, C2 and C3 and a gateway device GW.

Client devices C1, C2 and C3 are connected to a local network N1. The local network N1 may be a Local Area Network (LAN), such as, for example a wireless network (for instance Wifi I 802.IIa or b or g), an Ethernet network, or a mixed network composed of several different networks. The local network N1 is connected to a Wide Area network (WAN) network N2 (such as the Internet) by means of the gateway GW.

Each client device C1 to C3 is configured to establish one or more data sessions (such as a fixed rate streaming session, an adaptive streaming session (e.g. HAS), a bulk data session) by connecting with one or more of the remote servers S1, S2 via the WAN network N2. A data session may also be referred to as a traffic session, a data traffic session or a session. The client device C1, C2, C3 may be a communication device configured to receive and decode transmitted bitstream to render data such as multimedia data on the client device. In particular client devices C1 to C3 are adapted to implement MPEG-DASH protocol for adaptive streaming. In the illustrated example C1 is a laptop computer, C2 is a HD display and C3 is a smartphone.

During the playout of content, a client device C1, C2 or C3 can request chunks of content from a server S1 or S2 and may use knowledge of the conditions of network N1, its own constraints, and the lists of available representations of the same content (usually same content with different coding bitrates) in order to request the most appropriate representation. A chunk duration may be set to a few seconds, thus allowing the clients C1 to C3 to switch from one representation to another every few seconds in order to dynamically adapt to network conditions.

The list of available representations for a given content is described in a manifest file (MPD, Media Presentation Description) retrieved by the client device C1 to C3. After parsing the MPD the client device can discover the URLs from where to request content chunks. The MPD can also enable the client C1 to C3 to discover information (such as bandwidth requirements) about representations so it can perform dynamic adaptation by switching among all representations when network conditions require it.

Figure 2:
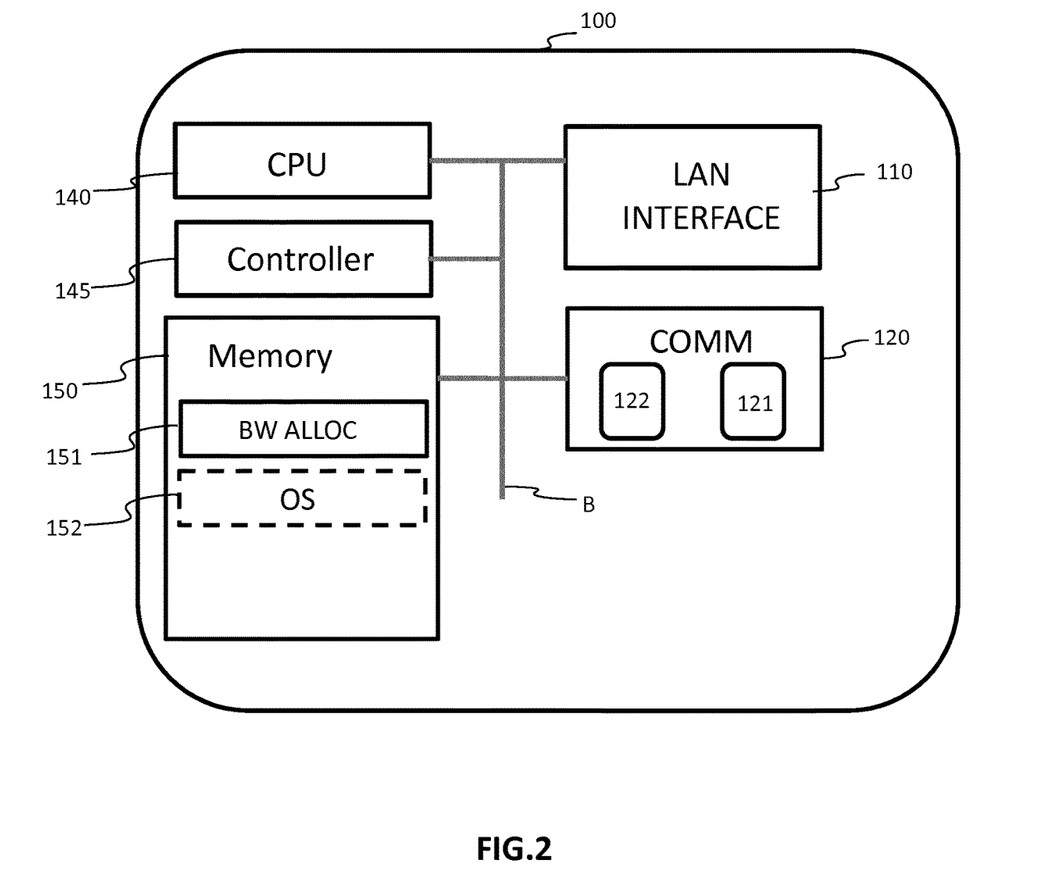
FIG. 2 is a schematic block diagram of a communication device according to an embodiment of the invention.

FIG. 2 is a block diagram illustrating a client device 100 according to an embodiment of the invention. The client device 100 may in some embodiments be a portable media device, a mobile phone, a tablet, a laptop, an HDTV, etc. It will be appreciated that the client device 100 might not comprise all the elements for rendering the received media content, but only some sub-elements such as elements for demultiplexing and decoding the media content and may rely upon an external device to render the decoded content to the end user.

The client device 100 comprises:

a LAN (Local Area Network) interface 110 (wired and/or wireless, such Wi-Fi, Ethernet, etc.) for connection to the local network N1;

a communication module 120 comprising a management interface 121 in association with a management communication bus implementing a publish/subscribe paradigm (e.g. Data Distribution Service (DDS), Java Message Service (JMS), Qeo, not represented in the drawings), whereby the device can send information messages to and receive information messages from all other devices C1 to C3 of the local network N1 and the gateway GW. The information message may be for example a persistent message, so that it can be collected by any device of the network (even if the device is not connected to the network N1 at the time of the sending). For example, a message can, for instance, be either collected by a background service running on the management interface 121 of the device or can be stored by the management communication bus as a long lived message to be retrieved by the management interface 121 (e.g. periodically or when necessary). The communication module also comprises an application interface 122 whereby control and data messages associated with a given session are sent and received by the device.

The communication module 120 contains protocol stacks for communication with servers S1, S2. In particular, the communication module 120 comprises a TCP/IP stack as well known in the art. It will be appreciated however, that any other type of network and/or communicating means may be used to enable the devices C1 to C3 to communicate with the servers S1, S2.

The client device 100 further comprises memory 150, a memory controller 145 and processing circuitry 140 comprising one or more processing units (CPU(s)). The one or more processing units 140 run various software programs and/or sets of instructions stored in the memory 150 to perform various functions for the client device 100 and to process data.

Software components stored in the memory include a bandwidth allocation module (or set of instructions) 151 for allocating bandwidth in accordance with embodiments of the invention. Other modules may be included such as an operating system module 152 for controlling general system tasks (e.g. power management, memory management) and for facilitating communication between the various hardware and software components of the client device 100.

In addition, depending on their type, devices C1 to C3 may also comprise an adaptive streaming module (which continually selects the chunk at the bit rate that better matches the network constraints and its own constraints), a video player adapted to decode and render the multimedia content, a buffer configured for buffering the chunks received from the server before their transmission to the video player, etc. (said modules not being represented in FIG. 2).

An internal bus B is provided for connecting the various modules and all means well known to the skilled in the art for performing the generic client device functionalities.

In FIG. 2 it will be appreciated that the illustrated modules correspond to functional modules, which may or may not correspond to distinguishable physical units. For example, a plurality of such modules may be associated in a unique component or circuit, or correspond to software functionalities. Moreover, a module may potentially be composed of separate physical entities or software functionalities.

A functional module may be implemented as a hardware circuit comprising for example VLSI circuits or gate arrays, discrete semiconductor conductors such as logic chips, transistors etc. A module may also be implemented in a programmable hardware device such as field programmable gate arrays, programmable array logic, programmable logic devices or the like. Moreover modules may also be implemented as a combination of software and one or more hardware devices. For example a module may be embodied in the combination of a processor that operates a set of operational data. Moreover, a module may be implemented in the combination of an electronic signal communicate via transmission circuitry.

In embodiments of the invention client devices C1, C2 and C3 exchange parameters describing their respective data sessions. While still using a typical DASH adaptation algorithm for the desired representation of data content, each client may then use the knowledge of other data sessions to prevent himself, in some cases, from taking too much bandwidth, so that a fair sharing of the network bandwidth may be cooperatively obtained.

Figure 3:
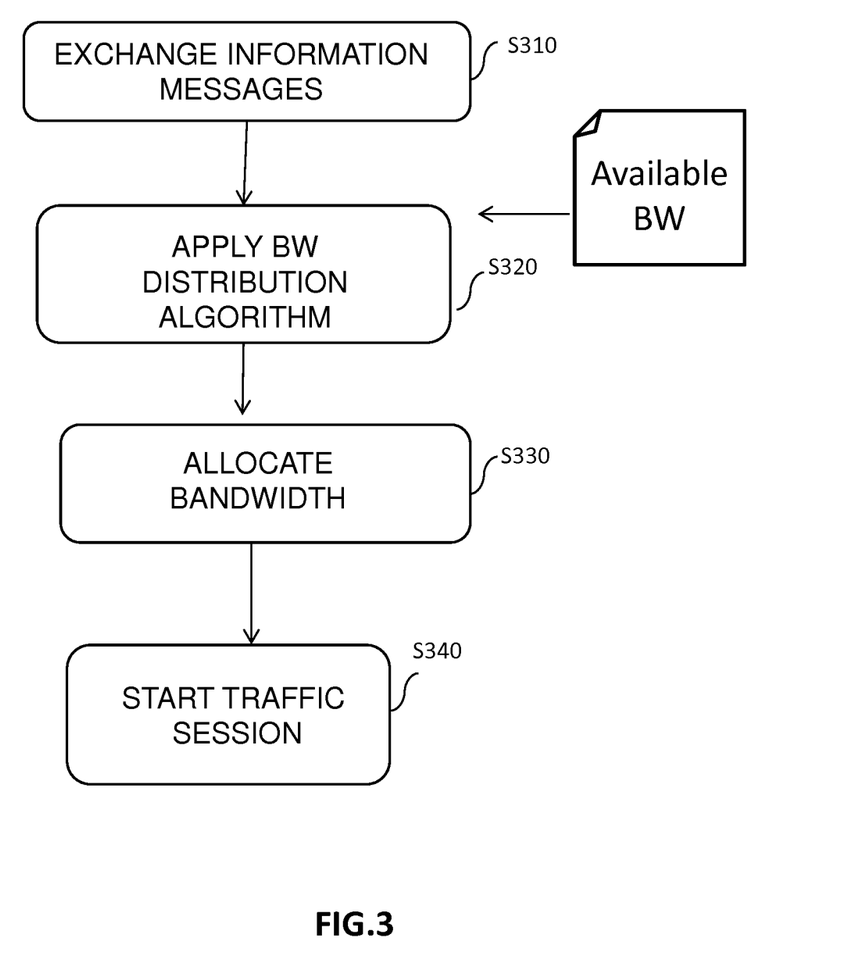
FIG. 3 is a flow chart of steps of a method of bandwidth distribution according to an embodiment of the invention.

A method of distribution of available bandwidth in the network N1, in accordance with an embodiment of the invention, will be described with reference to FIG. 3. The method of FIG. 3 may be implemented by any of the client devices C1 to C3 to share the available bandwidth of network N1. In some embodiments of the invention the total amount of available bandwidth of N1 to be shared between client devices C1 to C3 may be signaled from a central device. For example gateway device GW has a good view on the actual properties of the access link, and may also allocate bandwidth to different types of data traffic and can thus decide how much bandwidth is available for data sessions. In other embodiments of the invention, the client devices C1 to C3 typically estimate the overall bandwidth by, for example monitoring the speed at which they received a given number of the last packets or chunks they requested from the server.

In step S310 the client device C1 sends an information message to the other client devices C2, C3 in the network N1. The information message contains parameters indicative of the required bandwidth of a data session to be either initiated or already ongoing at the client device C1. In step S310 the client device C1 also receives from any of the other client devices C2 and/or C3 intending to start a data session (or having an ongoing session) an information message containing parameters indicative of the required bandwidth of a data session to be initiated or ongoing at the client device C2 or C3. It will be appreciated that there is no particular order to the reception or transmission of the bandwidth messages and the other devices may transmit their respective information messages before, after or in synchronization with the transmission of the information message from client C1.

In a particular embodiment of the invention whenever a new client device to the network sends its information message, all client devices that receive it also send their information message in a response to it. In this way, all client devices know about all other client devices in the network.

The parameters exchanged between the client devices in the information messages includes for each client device a list of bandwidth requirements which are related to the content representations they are ready to render, the DASH segments duration for these representations, a service priority (with respect to other clients), and, in some cases, their preferred representation bandwidth.

Examples of parameters contained in the information message include:

priority data representative of a level of priority or ranking of the corresponding data session;

chunk duration data representative of the time duration of a data segment of the corresponding data session; and bandwidth preference data representative of a preferred bandwidth of the corresponding data session.

The exchange of bandwidth requirement information between the client devices enables the client devices to have a view of other participating data sessions (and their preference in terms of bandwidth requirements and service priority).

In order to send information messages from one client device e.g. C1 of network N1 to other clients e.g. C2, C3 of the network N1 in the case where the client devices do not initially know about each other, the following two exchange modes may be used:

multicast messaging system

In this mode of exchange, all the client devices regularly send their information message to a fixed IP multicast address and all the client devices listen to the same IP multicast fixed address. By doing so, the client devices can at any time discover the presence of all other client devices that also implement bandwidth distributions algorithms and can receive their service information preferences. The IP multicast address may be set on the client device or may be configured by the user (using the same multicast on all devices). The information message is sent regularly by each client device on the multicast communication to signal to other client devices that they are still running and in case a new client device has joined the network (other client devices have no means of knowing about it). In another embodiment, a new client device on the network signals its arrival on the multicast address and all other client devices on the network can then send their information message directly to the new client device in unicast or on the multicast communication channel.

centralized message collection and redistribution

In this mode of exchange a central device is used to exchange the information messages. For example in a traditional home network environment, all devices running a DASH client share the same gateway. In this embodiment of information message exchange, all client devices C1 to C3 send their information message to the gateway GW and the gateway GW redistributes the information from each device to all other client devices using unicast communications to each device. The advantage of this centralized message collection mode is that it does not require client devices to regularly send their information message on a multicast communication channel and since the gateway GW knows at any time about the running of all DASH clients it can easily update all DASH clients in case where a new client arrives or a DASH client has left. The drawback of this mode is that it requires an extra mechanism on the home gateway whereas the other mode only requires extra mechanism on the client device itself.

In step S320 the client device C1 applies a bandwidth allocation algorithm to algorithm to provide an allocated bandwidth of the available bandwidth of N1 for the data session of client device C1. The bandwidth distribution algorithm uses bandwidth parameters contained in the information messages exchanged between the client devices.

The client devices of network N1 having a data session each apply a common bandwidth allocation algorithm to determine an allocated bandwidth of the available bandwidth for the data session of the particular client and the data sessions of other participating client devices. By applying a common algorithm conforming to a common set of rules the computations of the different clients can give consistent results. DASH data sessions are ranked by means of common criterions described in the bandwidth algorithms in conformity with embodiments of the present invention and each client device estimates the bandwidth allocated to other data sessions of higher ranking in the list before being able to compute the bandwidth to use for its own data session.

In one embodiment of the invention one or more of the following bandwidth algorithms may be available to be selected:

A first bandwidth distribution algorithm referred to herein as "even sharing among highest priority services" algorithm aims at evenly sharing bandwidth between the client devices having data sessions with the highest service priority. Highest service priority client share the maximum possible amount of available bandwidth in accordance with the representation bandwidth requirements of the data session. Remaining bandwidth, if any, is then shared unevenly among the data sessions with highest service priority—for example based on the time of sending the information message for the data session, and/or on the start time of the data session. Remaining bandwidth, if any (again), is then shared among the clients with second highest service priority in the same way it was done for clients with highest service priority. And so on, until there is no more bandwidth available.

A second bandwidth distribution algorithm referred to herein as "winner takes all" algorithm aims at giving the maximum possible bandwidth to the data session with highest service priority on a first come/first serve basis. First come refers to the data session of highest ranking for which the corresponding information session was sent earliest. Remaining bandwidth, if any, is then shared among the data sessions with second highest service priority. And so on, until there is no more bandwidth available.

A third bandwidth distribution algorithm referred to herein as "everybody is served" algorithm aims as ensuring that all data sessions are allocated their minimum required bandwidth with highest service priority data sessions being served first. Remaining bandwidth, if any, is used to switch data sessions previously allocated their minimum required bandwidth to representations with higher bandwidths. Highest service priority services are served first. And so on, until there is no more bandwidth available In some embodiments of the invention the exchanged information messages may contain bandwidth algorithm distribution data representative of a selected bandwidth distribution algorithm to be used to provide the allocated bandwidth.

Table 1 provides an example of how an information message could be generated from information/attributes of the MPD currently accessed by a DASH client.

TABLE 1

DASH Client information message

```
{
  "type": "object",
  "properties": {
    "id": {
      "type" : "string",
      "description" : "Unique identifier of the session. Can be the IP
address of device, followed by a unique session identifier in the
device."
    }
      "reprBandwidths": {
        "type": "array",
        "description": "List of needed bandwidth for available
representations for current play time. Ordered by increasing values.",
        "items": {
          "type": "integer",
          "description": "The @bandwidth attribute of one representation
(information retrieved from MPD). Note that the client may also add
some extra bandwidth margin to better accomodate with future
fluctuations."
        }
      },
      "segmentDuration": {
        "type": "integer",
        "description": "The duration of currently loading segment(s), in
milliseconds (information retrieved from MPD)."
      },
      "preferredClientBandwidth": {
        "type": "integer",
        "description": "The @bandwidth for the representation the client
would try to request if playing alone (information retrieved from
MPD).",
      },
      "servicePriority": {
        "type": "integer",
        "description": "This represents the priority of a streaming
session. Allocation of bandwidth is given first to higher priority
services.",
        "minimum": 1,
        "maximum": 4
      }
      "preferredBandwidthDistributionScheme": {
        "type": "integer",
        "description": "This represents the preferred bandwidth
distribution algorithm for a DASH client.",
      }
  }
}
```

In a possible embodiment of the invention, the service Priority values in Table 1 refer to:
  1. Premium service (e.g. UHD delivery, HD delivery to large screen TV sets, . . . )
  2. High Quality service (e.g HD delivery to medium size screens, . . . )
  3. Normal Quality service (e.g HD delivery to mobile devices, . . . )
  4. Low Quality service (e.g low quality content on mobile devices, . . . )

The "preferredBandwidthDistributionScheme" parameter in table 1 identifies the algorithm used to compute how bandwidth is shared among clients.

In some embodiments of the invention, client devices may add some extra bandwidth margin to the bandwidths described in the MPD for particular representations of the data content of the data session. For instance, if MPD describe three representations with the following bandwidths (8 Mbit/s, 6 Mbit/s & 2 Mbit/s) the preferred bandwidths table chosen by the client (and sent to other clients in the information message) could be (9 Mbit/s, 6.5 Mbit/s & 2.2 Mbit/s).

The bandwidth distribution algorithms according to embodiments of the invention will be described in more detail in what follows.

The first bandwidth distribution algorithm, according to an embodiment of the invention, referred to herein as "even sharing among highest priority services" sets out to share the bandwidth among the data sessions of highest priority to provide the highest possible quality to highest priority sessions based on the available bandwidth. Some data sessions are prevented from getting enough bandwidth to play, should not enough bandwidth be available to accommodate the data sessions of all client devices. The bandwidth distribution algorithm is performed at the client device.

Data sessions are ranked in order of priority using common criterions. A client device computes the bandwidth allocated to any higher ranking sessions in the list before being able to compute the bandwidth to use for its own data session.

For the first data session(s) with highest service priority, the bandwidth to be allocated to a data session is computed as an even sharing of the total available bandwidth. Then for the remaining data sessions, from higher service priorities to lower service priorities, the computation makes a share of the remaining bandwidth (subtracting the actual bandwidth allocated to previous sessions from the total available bandwidth).

Within each priority level, should not enough remaining bandwidth be available, data sessions are sorted within a given priority ranking according to the start times of the data sessions—earlier data sessions being allocated bandwidth before later data sessions.

At a given priority level, client devices try to take an "equal" share of the available bandwidth. Thus for each data session the available bandwidth is divided by the number of sessions in the same priority level. Since each data session is bound to a limited set of representations of the data content, the clients choose a representation having a bandwidth just below the computed share of the bandwidth.

It may be noted that clients of a lower priority may only be allocated bandwidth when the process leaves some unused bandwidth after all higher priority sessions have been served.

In the case where a new client device having a highest priority data session joins the network the existing data sessions are likely to reallocated less bandwidth if there is not enough bandwidth to accommodate the data session of the new client devices. In some cases an existing data session may have its allocation removed in favour of a data session of higher priority.

Because sharing between data sessions of the same priority level is done in an even way (e.g. in the case where two client devices have data sessions at the highest priority level each of the two data sessions are allocated half of the total bandwidth) even when client bandwidth needs are unequal, it is possible that after the initial allocation of the bandwidth has been done, some bandwidth is still available. For example a client device may be initially allocated a bandwidth of 10 MB/s. The best representation of its data content for the data session which can be accommodated in a 10 Mb/s bandwidth i.e. the greatest bandwidth requirement less than or equal to 10 Mb/s is 8 Mb/S. The remaining 2 Mb/s of the bandwidth may then be reallocated to another data session. In that case, all the remaining bandwidth is distributed among the highest priority data sessions of the remaining data sessions (on a first come first serve basis for data sessions of the same service priority) even if it eventually means that some clients would get more than an even share of the bandwidth within a given priority ranking. When the remaining bandwidth has been reallocated to the highest priority sessions, any further remaining bandwidth can be allocated to data sessions of less priority.

The advantage of this mode of bandwidth allocation is that for client device having data sessions at the highest priority service levels the data session is likely to be run with highest possible quality shared among all higher priority sessions (no lower priority sessions could actually steal away bandwidth from higher priority sessions). The data session may not be run at their highest quality though if the allocated bandwidth share is less than the bandwidth required for the best quality representation. Lower priority service clients would receive bandwidth in a best effort mode. There would be likely only enough bandwidth left, if any, for lower priority data sessions that would enable them to run a lower quality representation of the data content.

An example of the logic for the first mode of bandwidth allocation performed at the client device is set out in table 2.

TABLE 2

Receiver-side logic for bandwidth allocation mode 1

```
// DASH client
on_reception(sessionDescription)
{
  if sessionDescription.id not in all_sessions
  then
    // The newcomer needs to know our information
    send_param(all_sessions[my_session_id])
    // This session is new, note its starting time
    session_start_times[sessionDescription.id] = now( )
  end if
  // store session information for future use
  all_sessions[sessionDescription.id] = sessionDescription
}
// Use of session information in adaptation algorithm, for all collaborative
// clients
select_representation ( )
{
  // step 1: run algorithm as if client was alone
  chosen_representation =
  compute_representation_with_normal_algorithm( )
  all_sessions[my_session_id].preferredClientBandwidth =
  chosen_representation.get_bandwidth( )
  if something_changed_in_my_session( )
  then
    send_param(all_sessions[my_session_id])
  end if
  // step 2: run cooperative part
  remaining_bw = linkCapacity
  for p in 4..1 // scan priorities in decreasing order
  do
    session_list = get_sessions_with_priority(p)
    session_list.reverse_sort_according_to_start_times( )
    count = session_list.length
    for session in session_list
    do
      allocated = session.preferredClientBandwidth
      i = session.reprBandwidths.index_of(allocated)
      // look for a representation that fits an evenly distributed share.
      while allocated > remaining_bw / count and i > 0
      do
        i -= 1
        allocated = session.reprBandwidths[i]
      end while
      if allocated > remaining_bw
      then
        // no suitable representation for available bandwidth share
        session.allocated_index = -1
      else
        remaining_bw -= allocated
        session.allocated_index = 1
      end if
      count -= 1
    end for
    // Now all sessions of same priority p have tried to evenly share the
    // bandwidth. The remaining bandwidth will now be shared among
```

TABLE 2-continued

Receiver-side logic for bandwidth allocation mode 1

```
    // clients with priority p on a first come first serve basis.
    session_list.sort_according_to_start_times( ) // favor oldest
    sessions
    improvement_made = True
    while improvement_made and remaining_bw > 0
    do
      improvement_made = False
      for session in session_list
      do
        if session.allocated_index < session.reprBandwidths.length - 1
        // not already max
        then
          next_bitrate =
          session.reprBandwidths[session.allocated_index + 1]
          if session.allocated_index == -1
          then
            current_bitrate = 0
          else
            current_bitrate =
            session.reprBandwidths[session.allocated_index]
          end if
          if (next_bitrate - current_bitrate) < remaining_bw
          then // this session can get a bit more bandwidth
            session.allocated_index += 1
            remaining_bw -= next_bitrate - current_bitrate
            improvement_made = True
          end if
        end if
      end for
    end while
  end for
  return
  get_representation_for_level(all_sessions[my_session_id].-
  allocated_index)
}
```

The second bandwidth distribution algorithm, according to an embodiment of the invention, referred to herein as "winner takes all" aims to provide the highest possible quality to higher priority sessions, on a first come first serve basis. The first client device to send out its first information message, signaling to the possible other client devices in the network its presence, will receive the maximum required bandwidth for the data session it wishes to initiate. The maximum required bandwidth corresponds to the bandwidth required for the best quality representation of the data content of the data session with respect to other representations of the same content, which is less than or equal to the available bandwidth presentation.

Clients devices having data sessions of a lower priority can only receive bandwidth when the bandwidth distribution process leaves some unused bandwidth after allocation for all higher priority sessions has been performed. In the same way, if a highest priority service client sends an information message after a client device having a data session of the same highest priority has already been allocated most of the bandwidth, the later arriving client is unlikely to receive the maximum bandwidth requirement for its data session (no bandwidth will be taken away from first arrived client).

The advantage of this mode is that highest priority data sessions of client devices will always receive their maximum possible quality on a first come first serve basis. Client devices having highest priority data sessions performing bandwidth allocation after not enough bandwidth is left for them or lower priority service clients will be allocated bandwidth according to a best effort mode.

An example of the logic for the second mode of bandwidth allocation performed at the client device is set out in Table 3.

TABLE 3

Receiver-side logic for bandwidth allocation mode 2

```
// DASH client
on_reception(sessionDescription)
{
  if sessionDescription.id not in all_sessions
  then
    // The newcomer needs to know our information
    send_param(all_sessions[my_session_id])
    // This session is new, note its starting time
    session_start_times[sessionDescription.id] = now( )
  end if
  // store session information for future use
  all_sessions[sessionDescription.id] = sessionDescription
}
// Use of session information in adaptation algorithm,
// for all collaborative clients
select_representation ( )
{
  // step 1: run algorithm as if client was alone
  chosen_representation = compute_representation_with_normal_algorithm( )
  all_sessions[my_session_id].preferredClientBandwidth =
                    chosen_representation.get_bandwidth( )
  if something_changed_in_my_session( )
  then
    send_param(all_sessions[my_session_id])
  end if
  // step 2: provide maximum bandwidth to a maximum number of clients,
starting with higher priority ones.
  remaining_bw = linkCapacity
  for p in 4..1 // loop on service priorities in decreasing order
  do
    session_list = get_sessions_with_priority(p)
    session_list.sort_according_to_start_times( )
    for session in session_list
    do
      if remaining_bw > session.preferredClientBandwidth
      then   // is there enough bandwidth for maximum representation
        session.allocated_index =
session.reprBandwidths.index_of(session.preferredClientBandwidth)
        // chosen representation is preferred one
        remaining_bw -= session.preferredClientBandwidth
      else
        session.allocated_index = -1 // not enough bandwidth for preferred
rep.
      end if
    end for
  end for
  // at this point, provided there is enough bandwidth, all sessions have been
  // allocated their preferred representation, starting with higher priority
  // service sessions and starting with earliest sessions within each priority
  // session. If total bandwidth is not enough, highest priority sessions (and
  // earliest ones within the same service priority) are served first.
  // step 3: distribute remaining bandwith (until it is exhausted) between all
clients, starting with higher priority ones
  improvement_made = True
  while remaining_bw > 0 and improvement_made do
    improvement_made = False
    for p in 4..1 // loop on service priorities in decreasing order
    do
      session_list = get_sessions_with_priority(p)
      session_list.sort_according_to_start_times( )
      for session in session_list
      do
        i = session.allocated_index
        if i < session.reprBandwidths.length - 1 // not already max
          bw_upgrade = session.reprBandwidths[i+1]- session.reprBandwidths[i]
          if remaining_bw > bw_upgrade then  // is there enough bandwidth to
                                              // upgrade to next representation
            Improvement_made = True
            session.allocated_index += 1
            remaining_bw -= bw_upgrade
          end if
        end if
      end for
    end for
  end while
  return
```

TABLE 3-continued

Receiver-side logic for bandwidth allocation mode 2

```
get_representation_for_level(all_sessions[my_session_id].allocated_index)
}
```

The third bandwidth distribution algorithm, according to an embodiment of the invention, referred to herein as "everybody is served" sets out to provide bandwidth for all data sessions of the client devices, provided there is enough bandwidth, by giving them enough bandwidth to run their minimum required bandwidth representation for the data session i.e. the bandwidth corresponding to the representation requiring the least bandwidth compared to other representations. If not enough bandwidth is available to serve all data sessions of the client devices, a decision is taken by prioritizing data sessions according to service priority and then on a first come first serve basis among clients with same priority level.

Any remaining bandwidth is then distributed among data sessions of client devices based on service priority and on a first come first serve mode (based on time of transmission of the respective information message) so that data sessions of highest priority can have better quality representations than the minimum bandwidth representation of the data content.

The advantage of this mode is that, provided there is enough bandwidth for all clients, all clients are able to run one representation of their data content. Highest priority service clients are likely to have the opportunity to run a representation providing a better quality than their minimum bandwidth representation if enough bandwidth is available An example of the logic for the third mode of bandwidth allocation performed at the client device is set out in table 4.

TABLE 4

Receiver-side logic for bandwidth allocation mode 3

```
// DASH client
on_reception(sessionDescription)
{
  if sessionDescription.id not in all_sessions
  then
    // The newcomer needs to know our information
    send_param(all_sessions[my_session_id])
    // This session is new, note its starting time
    session_start_times[sessionDescription.id] = now( )
  end if
  // store session information for future use
  all_sessions[sessionDescription.id] = sessionDescription
}
// Use of session information in adaptation algorithm,
// for all collaborative clients
select_representation ( )
  {
  // step 1: run algorithm as if client was alone
  chosen_representation = compute_representation_with_normal_algorithm( )
  all_sessions[my_session_id].preferredClientBandwidth =
                           chosen_representation.get_bandwidth( )
  if something_changed_in_my_session( )
  then
     send_param(all_sessions[my_session_id])
  end if
  // step 2: provide minimum bandwidth to a maximum number of clients,
starting
  // with higher priority ones.
  remaining_bw = linkCapacity
  for p in 4..1 // loop on service priorities in decreasing order
  do
     session_list = get_sessions_with_priority(p)
     session_list.sort_according_to_start_times( )
     for session in session_list
     do
       if remaining_bw > session.reprBandwidths[0] then
          session.allocated_index = 0    // chosen representation is first one
                                         // (minimum bandwidth)
          remaining_bw -= session.reprBandwidths[0]
       else
          session. allocated_index = -1 // no representation
       end if
     end for
  end for
  // at this point, provided there is enough bandwidth, all session have been
  //allocated their minimum bandwidth, starting with higher priority service
  // sessions and starting with earliest sessions within each priority
session.
  // If total bandwidth is not enough, highest priority sessions (and earliest
  // ones within the same service priority) are served first.
```

TABLE 4-continued

Receiver-side logic for bandwidth allocation mode 3

```
// step 3: distribute remaining bandwith (until it is exhausted) between all
clients, starting with higher priority ones
  improvement_made = True
  while remaining_bw > 0 and improvement_made do
    improvement_made = False
    for p in 4..1 // loop on service priorities in decreasing order
    do
      session_list = get_sessions_with_priority(p)
      session_list.sort_according_to_start_times( )
      for session in session_list
      do
        i = session.allocated_index
        if i < session.reprBandwidths.length − 1 // not already max
          bw_upgrade = session.reprBandwidths[i+1]− session.reprBandwidths[i]
          if remaining_bw > bw_upgrade then // is there enough bandwidth to
                                           // upgrade to next representation
            Improvement_made = True
            session.allocated_index += 1
            remaining_bw −= bw_upgrade
          end if
        end if
      end for
    end for
  end while
  return
get_representation_for_level(all_sessions[my_session_id].allocated_index)
}
```

All the client devices inform the other client devices on their preferred bandwidth distribution scheme. Data indicative of the preferred bandwidth distribution algorithm can be included in the information message transmitted from a client device to the other client devices of the network N1.

In some cases there may be a conflict between the choice of bandwidth distribution algorithm.

This can be solved in different ways such as:
the bandwidth distribution algorithm indicated by majority in the information messages is selected
all the client devices are aware of a common prioritized list of bandwidth distribution schemes and higher priority one wins
the bandwidth distribution algorithm indicated in the first transmitted information message is selected The three different modes of bandwidth distribution will be illustrated in the following examples If we consider two client devices C1 and C2 having forthcoming data sessions with the following preferences:

Client C1 sends the corresponding information message for its data session before client C2:
representation C1.2=10 Mbit/s
representation C1.1=8 Mbit/s
representation C1.0=4 Mbit/s
service_priority=Premium
Client C2:
representation C2.1=6 Mbit/s
representation C2.0=2 Mbit/s
service_priority=Premium Using the three different modes of bandwidth allocation, with a total available bandwidth of 14 Mbit/s in the network N1, the distribution of the bandwidth would be as follows:

Mode 1—even sharing: All data sessions are of the highest priority so the available bandwidth of 14 Mbit/s is initially distributed evenly between the two data sessions of C1 and C2 i.e. 7 Mbit/s each.

For client C1 the greatest bandwidth requirement which is less than or equal to 7 Mbit/s is 4 Mbit/s corresponding to representation C1.0—client C1 is thus initially allocated a bandwidth of 4 Mbit/s.

For client C2 the greatest bandwidth requirement which is less than or equal to 7 Mbit/s is 6 Mbit/s corresponding to representation C2.1—client C1 is thus initially allocated a bandwidth of 6 Mbit/s, corresponding to its best quality representation.

4 Mbit/s of the available bandwidth remains. This is allocated to client C1 since client C1 sent its information message before client C2. This enables the bandwidth allocated to client C1 to be increased to 8 Mbit/s corresponding to the better quality representation C1.1.

In summary the allocation of the available bandwidth is as follows:

Client C1=>C1.1 (8 Mbit/s); Client C2=>C2.1 (6 Mbit/s); remaining bandwidth=0 Mbit/s; No bandwidth left to allocate to lower priority level data sessions or to other client devices joining the network later.

Mode 2—Winner takes all:

Client C1 is allocated 10 Mbit/s corresponding to its maximum bandwidth requirement for its best quality representation C1.2 since it was first to send the information message. 4 Mbit/s of bandwidth remains to be allocated to client C2. The bandwidth requirement less than or equal to 4 Mbit/s is 2 Mbit/s corresponding to the lower quality representation of C2.0.

In summary allocation of the available bandwidth is as follows:

Client C1=>C1.2; Client C2=>C2.0; remaining bandwidth=2 Mbit/s. Bandwidth left to allocate to lower priority level data sessions of other client devices according to any bandwidth allocation mode or according to data session start time.

Mode 3—Everybody is served:

Allocating the lowest bandwidth requirement of each client C1 and C2, respectively 4 Mbit/s (C1.0) and 2 Mbit/s (C2.0) leaves a remaining bandwidth of 8 Mbit/s enabling both data sessions to be moved up to a better quality representation by increased bandwidth allocation—C1.1 (8 Mit/s) for client C1 and—C2.1 (6 Mbit/s)

In summary allocation of the available bandwidth is as follows:

Client C1=>C1.1; Client C2=>C2.1; remaining bandwidth=0 Mbit/s

If then a third client joins the network for a data session with the following preferences:

Client C3:
representation C3.2=5 Mbit/s
representation C3.1=3 Mbit/s
representation C3.0=2 Mbit/s
service_priority=Premium Using the three different modes of bandwidth allocation, with a total bandwidth of 14 Mbit/s, distribution of bandwidth would be as follows:

Mode 1—Even sharing:

All data sessions are of the highest priority so the available bandwidth of 14 Mbit/s is initially distributed evenly between the three data sessions of C1, C2 and C3 i.e. 4.66 Mbit/s each.

Client C1 is thus allocated 4 Mbit/s (service C1.0) since this is the only representation with a bandwidth less than 4.66 Mbit/s Client C2 is thus allocated 2 Mbit/s (service C2.0) since this is the only representation with a bandwidth less than 4.66 Mbit/s Client C3 is thus allocated 3 Mbit/s (service C3.1) since this is the best representation with a bandwidth less than 4.66 Mbit/s 5 Mbit/s of bandwidth remains. Client C1 who was first on the network is allocated 4 Mbit/s of the remaining bandwidth on a first come first served basis since client C1 was first to send an information message for its data session enabling him to have an improved C1.1 representation at a bandwidth 8 Mbit/s In summary, the allocation of the available bandwidth is as follows:

Client C1=>C1.1 (8 Mbit/s); Client C2=>C2.0 (2 Mbit/s); Client C3=>C3.1 (3 Mbit/s); remaining bandwidth=1 Mbit/s Mode 2—Winner takes all:

Client C1 is allocated 10 Mbit/s corresponding to its maximum bandwidth requirement for its best quality representation C1.2 since it was first to send the information message. 4 Mbit/s of bandwidth remains to be shared between the data sessions of client devices C2 and C3. The data session of client device C2 is allocated a bandwidth of 2 Mbit/s for a representation of C2.0 while the client device C3 is also allocated a bandwidth of 2 Mbit/s for a representation of C2.0.

In summary, the allocation of the available bandwidth is as follows:

Client C1=>C1.2; Client C2=>C2.0; Client C3=>C3.0; remaining bandwidth=0 Mbit/s

Mode 3—Everybody is served:

Allocating the lowest bandwidth requirement of each client C1, C2 and C3, respectively 4 Mbit/s (C1.0) 2 Mbit/s (C2.0) and 2 Mbit/s (C3.0) leaves a remaining bandwidth of 6 Mbit/s enabling data sessions of client device C1 and C3 to be moved up to a better quality representation by increased bandwidth allocation—C1.1 (8 Mbit/s) for client C1 and—C3.1 (3 Mbit/s) for client device C3

Client C1=>C1.1 (8 Mbit/s); Client C2=>C2.0 (2 Mbit/s); Client C3=>C3.1 (3 Mbit/s)

remaining bandwidth=1 Mbit/s

In step S330 the bandwidth is allocated to the data session enabling the data session to be run in step S340

Embodiments of the present invention provides a messaging mechanism that allows clients, such as DASH clients on a network to find out about forthcoming or ongoing data sessions of other clients on the network and their preferred content consumption requirements. In this way a fairer sharing of available network bandwidth may be achieved enabling clients, to benefit from a better service than they would if they fought over same network bandwidth together. Embodiments of the invention may be applied before impending data sessions are started, while data sessions are ongoing, for example enabling bandwidth to be reallocated to ongoing data sessions when a new data session starts in the network or when an ongoing data session in the network ends.

Although the present invention has been described hereinabove with reference to specific embodiments, the present invention is not limited to the specific embodiments, and modifications will be apparent to a skilled person in the art which lie within the scope of the present invention.

For instance, while the foregoing examples have been described with respect to MPEG-DASH it will be appreciated that the invention may be applied to any adaptive streaming or data downloading environments.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A method for distributing available bandwidth in a network among a plurality of streaming data sessions of communication devices in the network, the method comprising, at a communication device of the communication devices:

receiving, at a management interface of the communication device, information messages including bandwidth parameters from other communication devices in the network, each information message being indicative of a required bandwidth for a data session to be run or running at a respective one of the other communication devices from which the corresponding information message is sent;

applying, by a processor of the communication device, a determined bandwidth distribution algorithm stored in a memory of the communication device using at least one bandwidth parameter received from the other communication devices in the network to determine a bandwidth for allocation to the communication device for the data session, said determined bandwidth distribution algorithm being determined from a plurality of bandwidth distribution algorithms based on at least one of the information messages and a prioritized bandwidth distribution algorithm list.

2. The method according to claim 1 wherein the determined bandwidth distribution algorithm comprises dividing the available bandwidth into equal shares for allocation to each of the data sessions having a highest level of priority.

3. The method according to claim 2, wherein a data content of each data session has a corresponding plurality of representations and wherein one of the representations is selected according to the equal share of the bandwidth for allocation, a selected representation being a representation requiring a greatest bandwidth which is less than or equal to the equal share of the bandwidth for allocation.

4. The method of claim 3, wherein the plurality of representations each comprise a content such that each of the plurality of representations has a different content property.

5. The method of claim 4, wherein the content property is a bit rate.

6. The method according to claim 3, wherein, when the required bandwidth for the selected representation is less than the equal share of the bandwidth for allocation, at least part of a remaining bandwidth is reallocated to a data session of the highest priority for which the corresponding information message was sent before other information messages for data sessions of the highest priority.

7. The method according to claim 3, wherein, when the required bandwidth for the selected representation is less than the equal share of the bandwidth for allocation, at least part of a remaining bandwidth is allocated to a data session of a lower priority level based on at least one of: a priority level of the data session; a time of transmission of the corresponding information message; and a start time of the data session.

8. The method according to claim 2, wherein within a given priority level the available bandwidth remaining is allocated based on at least one of a time of transmission of the information message for the corresponding data session and a start time of the data session.

9. The method according to claim 1, wherein the same bandwidth allocation algorithm is used by the communication device and the other communication devices starting or running a data session.

10. The method according to claim 9, wherein the bandwidth allocation algorithm is determined according to at least one of a priority level allocated to each bandwidth allocation algorithm and a number of communication devices selecting each bandwidth algorithm.

11. The method according to claim 1, wherein at least one parameter in each respective information message comprises at least one of:
priority data representative of a level of priority of a corresponding data session;
chunk duration data representative of a time duration of a data segment of the corresponding data session; and
bandwidth data representative of at least one operable bandwidth of the corresponding data session.

12. The method according to claim 1 wherein the information messages comprise bandwidth distribution algorithm data representative of the determined bandwidth distribution algorithm to be used to provide the bandwidth for allocation.

13. The method according to claim 1, wherein the determined bandwidth distribution algorithm comprises allocating a maximum possible bandwidth to at least one data session in order of a level of priority and for which a corresponding information message was sent before other information messages for other data sessions of a same priority, a maximum possible bandwidth corresponding to a representation of a content of the data session requiring a greatest bandwidth with respect to other representations of the same content, within an available bandwidth.

14. The method according to claim 1, wherein the determined bandwidth distribution algorithm comprises allocating the bandwidth corresponding to a representation of a content of the data session requiring a least amount of bandwidth at the communication device.

15. The method according to claim 1 further comprising reallocating any remaining available bandwidth to a data session to enable a higher level of representation based on at least one of a priority level of the data session, a time of transmission of the corresponding information message and a start time of the data session.

16. The method according to claim 1, wherein the information messages are sent to and received from a fixed multicast address for forwarding to the communication device and the other communication devices.

17. The method according to claim 1, wherein the information messages are exchanged via a central base device.

18. A communication device in a network comprising:
a communication interface for exchanging information messages with one or more other communication devices in a same network, each information message comprising at least one bandwidth parameter indicative of a required bandwidth for a streaming data session to be started at the respective communication device from which the corresponding information message is sent;
a memory for storing a plurality of bandwidth distribution algorithms; and
one or more processors for:
for applying a determined bandwidth distribution algorithm using the at least one bandwidth parameter received from the other communication devices to determine a bandwidth for allocation for said communication device for a data session, said determined bandwidth distribution algorithm being determined from a plurality of bandwidth distribution algorithms based on at least one of the information messages and a prioritized bandwidth distribution algorithm list.

19. The communication device according to claim 18 wherein the at least one or more processors:
obtain the at least one bandwidth parameter from information messages exchanged between communication devices of the network and indicative of the required bandwidth for the streaming data session, and wherein the at least one bandwidth parameter comprises at least one of:
priority data representative of a level of priority of the corresponding data session;
chunk duration data representative of a time duration of a data segment of the corresponding data session; and
bandwidth data representative of at least one operable bandwidth of the corresponding data session.

20. A computer program product stored on a non-transitory computer readable medium for a programmable apparatus of a communication device within a network, the computer program product comprising a sequence of instructions for, when executed by the programmable apparatus,
receiving, at a management interface of the communication device, information messages including bandwidth parameters from other communication devices in the network, the information messages being indicative of a required bandwidth for a data session to be run or running at a respective one of the communication devices from which the corresponding information message is sent; and
applying, by a processor of the communication device, a determined bandwidth distribution algorithm stored in a memory of the communication device using at least one bandwidth parameter received from the other communication devices to obtain bandwidth for allocation to the communication device for a data session, said determined bandwidth distribution algorithm being determined from a plurality of bandwidth distribution algorithms based on at least one of the information messages and a prioritized bandwidth distribution algorithm list.

21. The method of claim 20, wherein the determined bandwidth distribution algorithm further distributes a remaining bandwidth on a first come first serve basis for the communication devices.

22. A method for distributing available bandwidth in a network among a plurality of streaming data sessions of communication devices in the network, the method comprising:
- applying, at one of the communication devices, the determined bandwidth distribution algorithm stored in a memory of the one of the communication devices to provide bandwidth for allocation for each streaming data session to be run or being run by the other communication devices of the network, said determined bandwidth distribution algorithm being determined from a plurality of bandwidth distribution algorithms based on at least one of the information messages and a prioritized bandwidth distribution algorithm list;
- wherein the determined bandwidth distribution algorithm divides the available bandwidth into equal shares for allocation to each of the streaming data sessions having a highest level of priority.

23. The method according to claim 22, wherein a data content of each streaming data session has a corresponding plurality of representations and wherein one of the representations is selected for each streaming data session according to an equal share of the bandwidth for allocation, a selected representation being a representation requiring a greatest bandwidth which is less than or equal to the share of the bandwidth for allocation.

\* \* \* \* \*